(12) United States Patent
Ma et al.

(10) Patent No.: US 8,321,280 B2
(45) Date of Patent: Nov. 27, 2012

(54) DEMAND FORECASTING SYSTEM AND METHOD FOR ONLINE ADVERTISEMENTS

(75) Inventors: WenJing Ma, Santa Clara, CA (US); Long Ji Lin, San Jose, CA (US); Jian Yang, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 954 days.

(21) Appl. No.: 12/243,347

(22) Filed: Oct. 1, 2008

(65) Prior Publication Data

US 2010/0082442 A1 Apr. 1, 2010

(51) Int. Cl.
*G06Q 30/00* (2006.01)
(52) U.S. Cl. .................................. 705/14.73
(58) Field of Classification Search ................ 705/7.25, 705/7.29, 7.31, 10, 28, 14.43
See application file for complete search history.

(56) References Cited

U.S. PATENT DOCUMENTS

| | | | |
|---|---|---|---|
| 5,827,267 A * | 10/1998 | Savage et al. | 606/16 |
| 6,611,726 B1 * | 8/2003 | Crosswhite | 700/99 |
| 6,883,152 B2 | 4/2005 | Bednar et al. | |
| 7,131,099 B2 | 10/2006 | Schuppe | |
| 7,134,100 B2 | 11/2006 | Ravi et al. | |
| 7,136,871 B2 * | 11/2006 | Ozer et al. | 1/1 |
| 7,251,589 B1 * | 7/2007 | Crowe et al. | 702/189 |
| 7,761,373 B2 * | 7/2010 | Metz | 705/38 |
| 7,797,189 B2 * | 9/2010 | Rai et al. | 705/7.22 |
| 7,835,939 B1 * | 11/2010 | Karlsson | 705/7.31 |
| 2002/0120492 A1 * | 8/2002 | Phillips et al. | 705/10 |
| 2003/0171990 A1 * | 9/2003 | Rao et al. | 705/14 |
| 2006/0271429 A1 * | 11/2006 | Borgs et al. | 705/14 |
| 2008/0275759 A1 * | 11/2008 | Parkes et al. | 705/10 |
| 2010/0030617 A1 * | 2/2010 | Handley | 705/10 |
| 2010/0042496 A1 * | 2/2010 | Wang et al. | 705/14.49 |

OTHER PUBLICATIONS

Merriam-Webster's Collegiate Dictionary, Tenth Edition at. p. 1236 (Merriam-Webster, Incorporated 1998).*

* cited by examiner

*Primary Examiner* — John Weiss
*Assistant Examiner* — Bennett Sigmond
(74) *Attorney, Agent, or Firm* — Mauriel Kapouytian & Treffert LLP

(57) ABSTRACT

A computer implemented system includes a computer readable storage medium which includes historical demand data for a plurality of advertising inventories, and a processor connected to the computer readable storage medium. The processor is configured for generating a first demand forecast for a first predetermined period of time and a second demand forecast for a second predetermined period of time. The processor is configured for adjusting the first demand forecast by removing an existing demand for each of the plurality of advertising inventories, and for generating a net forecasting demand for each of the plurality of inventories for a third predetermined period of time by combining the second demand forecast and an adjusted first demand forecast. The third predetermined period of time is based on the first and second predetermined periods.

13 Claims, 4 Drawing Sheets

DEMAND FORECASTING SYSTEM AND METHOD FOR ONLINE ADVERTISEMENTS

FIELD OF DISCLOSURE

The disclosed system and method relate to demand forecasting. More specifically, the disclosed system and method relate to demand forecasting for online publishers.

BACKGROUND

An electronic publisher treats available advertising space as inventory. As used herein, the term "inventory" can include available advertising space in a variety of media, including but not limited to web pages, portions of web pages, banners, buttons, pop-up windows, placement within sponsored search listings, and streaming media (including video and/or audio). Each time one of these advertisement types is played for, or presented to, a user constitutes an "impression." The inventory of advertising space includes the capacity to render advertising in any of these formats.

The term "advertising" as used herein is not limited to commercial advertising, but may also include any purchase or donation of the ability to deliver information content of any type. For example, a public service notice or a pure entertainment streaming video that is purchased by a sponsor, but only delivers information to the recipient without asking the recipient to take any action or make any purchase would still be encompassed by the term "advertisement" as used herein.

Advertising media inventory may be divided into two general classes. The first type is "guaranteed" inventory. This inventory is generally paid for in advance and is guaranteed (by contract) to be delivered within a certain period. Because of this constraint, guaranteed inventory cannot be oversold, and an inventory management system exists to measure and regulate inventory availability. Guaranteed inventory is generally sold to large, branding-oriented advertisers who need reliable delivery to achieve their marketing goals and are willing to pay premium prices for that inventory. Guaranteed inventory is typically sold on a cost-per-impression (CPI) basis.

The second type of media inventory is "non-guaranteed". Non-guaranteed inventory comprises the remnant of available inventory after guaranteed inventory is served. Non-guaranteed advertising is generally paid for in arrears, because it can be preempted at the publisher's discretion without violating any contractual obligation. Non-guaranteed inventory serves as a sink for excess supply and can be thought of as a "spot" or "auction" marketplace. This inventory is usually sold to smaller advertisers, often to direct marketers who wish to drive transactions rather than branding.

Non-guaranteed inventory is most frequently sold on a performance basis, meaning that the advertiser pays based only in the event of a response to an ad, rather than just for placement of that ad. This performance basis adds uncertainty to the estimation of the value (on a per-impression basis) of a media purchase.

Prior inventory management systems may include demand forecasting modules for guaranteed inventory. However, these forecasting modules only provide limited granularity or detail about the demand, e.g., only provides a forecast of the total amount of guaranteed inventory that may be needed or sold. The limited detail provided by prior systems creates difficulty in arriving at optimal pricing for the placement of advertisements that will occur in the future.

An improved demand forecasting system is desirable.

SUMMARY

In some embodiments, a method includes generating a first demand forecast for a plurality of advertising inventories for a first predetermined period of time, generating a second demand forecast for the plurality of advertising inventories for a second predetermined period of time, adjusting the first demand forecast for at least one of the plurality of advertising inventories by reducing the first demand forecast by an amount of an existing demand for the advertising inventory, combining the second demand forecast with an adjusted first demand forecast for the each of the plurality of advertising inventories to identify a net demand forecast for each of the plurality of advertising inventories for a third predetermined period of time, and outputting the net demand forecast for each of the plurality of advertising inventories to a display or machine readable storage medium. The third predetermined period of time based on the first predetermined period of time and the second predetermined period of time.

The method may be embodied in a computer readable medium that may be loaded to a processor. Such that when the processor executes the code it performs the method. A system to implement the process may also be implemented.

The forecasting method and system enables demand forecasting for a plurality of advertising inventories enabling an online publisher to manage and adjust its pricing for each of its plurality of inventories. Additionally, the demand forecast provides an online publisher with a forecast that takes into account current demand levels so the publisher is provided with a forecast new demand for the advertising inventory.

DETAILED DESCRIPTION

Figure 1:
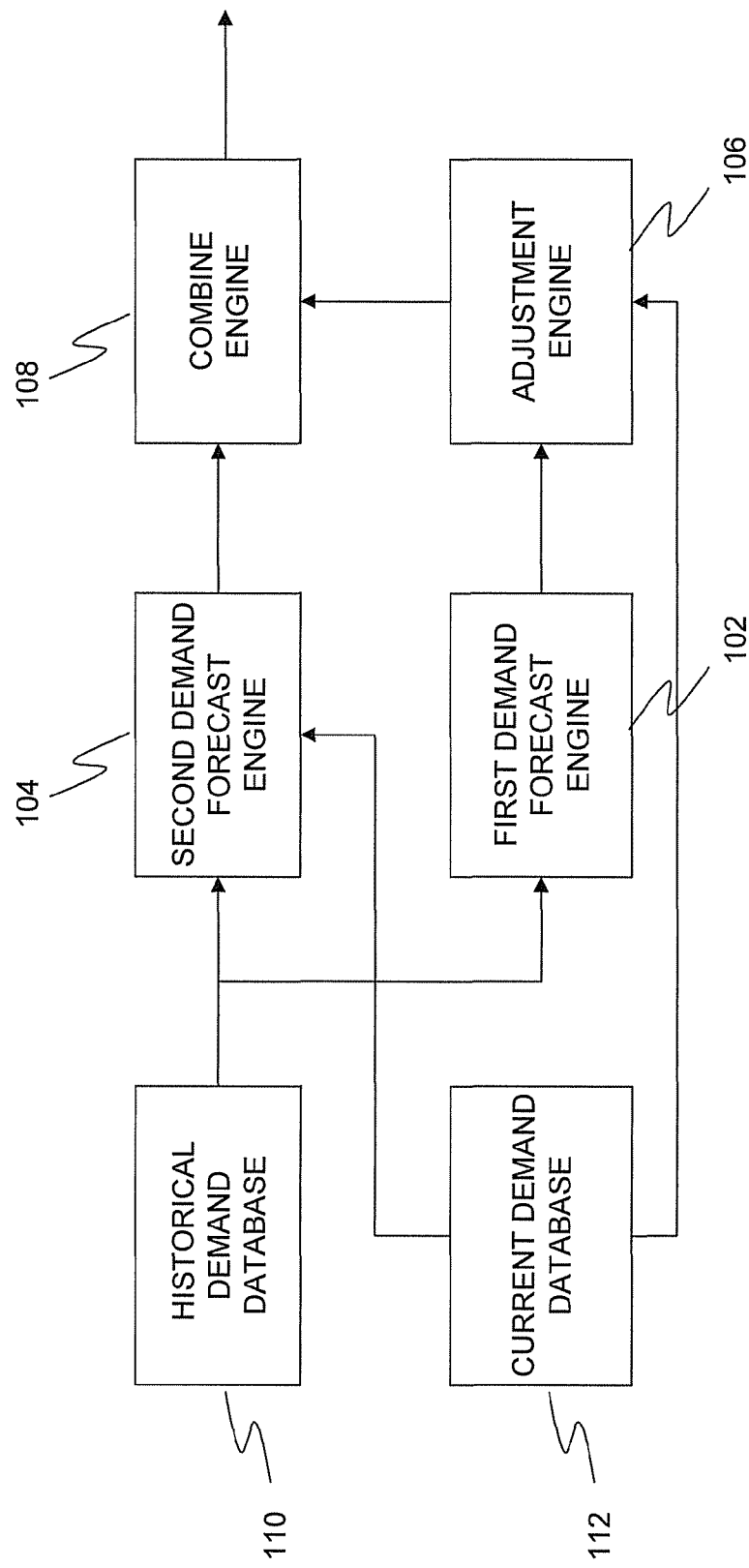
FIG. 1 illustrates a block diagram of a demand forecasting system.

With reference to FIG. 1, an improved demand forecasting system 100 is now described. In one embodiment, the demand forecasting system is configured to forecast demand for guaranteed inventory. However, system 100 may also be used to forecast non-guaranteed demand or forecast any other type of inventory demand. As shown in FIG. 1, demand forecasting system 100 includes a first demand forecast engine 102, a second demand forecast engine 104, an adjustment engine 106, and a combine engine 108. Demand forecasting system 100 also includes a historical demand database 110 coupled to the first demand forecast engine 102 and the second forecast engine 104. A current demand database 112 is coupled to the second demand forecast engine 104 and adjustment engine 106. Adjustment engine 106 is also coupled to the first demand forecast engine 102. Combine engine 108 is coupled to both the second demand forecast engine 104 and the adjustment engine 106.

Figure 2:
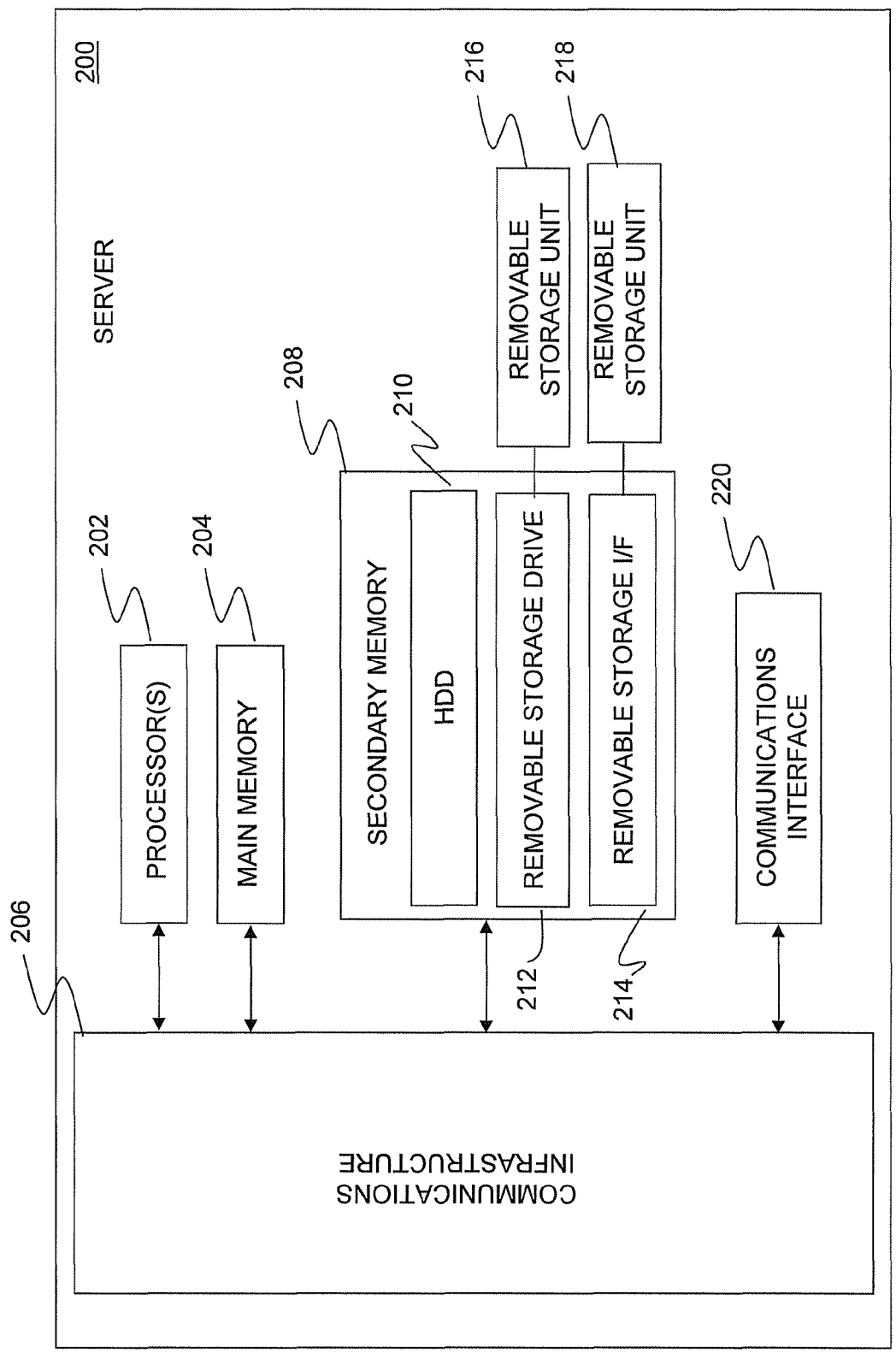
FIG. 2 illustrates a block diagram of one example of an architecture of an electronic device in the demand forecasting system of FIG. 1 may be implemented.

Demand forecasting system 100 may be installed on a computer, server, or other electronic device capable of performing calculations. An example of an architecture of a server that may be configured as a demand forecasting engine 100 is illustrated in FIG. 2. As shown in FIG. 2, server 200 may include one or more processors 202, which may be coupled to a wired or wireless communication infrastructure 206 (e.g., a communications bus, cross-over bar, local area network (LAN), or wide area network (WAN)). Processors 202 may be configured to process in parallel or in series.

Server 200 may include a main memory 204, e.g., a local or working memory, such as a random access memory (RAM). Server 200 may also include a secondary memory 208 that is more persistent than main memory 204. Examples of secondary memory include, but are not limited to a hard disk drive 210 and/or removable storage drive 212, representing a floppy disk drive, a magnetic tape drive, an optical disk drive, or the like. The removable storage drive 212 may read from and/or write to a removable storage unit 216. Removable storage unit 216 may be a floppy disk, magnetic tape, CD-ROM, DVD-ROM, optical disk, ZIP™ drive, or the like, which may be written to and/or read by removable storage drive 212. Removable storage unit 212 may include a machine readable storage medium 216 having stored therein computer software and/or data.

In some embodiments, secondary memory 208 may include other similar devices for allowing computer programs or other instructions to be loaded into server 200 such as a removable storage unit 218 and an interface 214. An example of such a device 218 and socket 214 includes, but is not limited to, an external hard disk drive or a USB flash drive and associated USB port, respectively. Other removable storage units 218 and interfaces 214 that allow software and data to be transferred from the removable storage unit 218 to server 200 may be used.

Server 200 may also include a communications interface 220. Communications interface 220 allows software and data to be transferred between server 200 and external devices, such as other servers or computers. Examples of communications interface 220 may include a modem, a network interface (such as an Ethernet card), a communications port, a Personal Computer Memory Card International Association (PCMCIA) slot and card, or the like. Software and data transferred via communications interface 220 are in the form of signals, which may be electronic, electromagnetic, optical, or any other signal capable of being received by communications interface 220. These signals are provided to communications interface 220 via a communications path or channel. The path or channel that carries the signals may be implemented using wire or cable, fiber optics, a telephone line, a cellular link, a radio frequency (RF) link, and the like.

Historical demand database 110 contains historical demand data for a period of time. For example, the historical demand database 110 may include data for a predetermined set of days, months, or years. In one embodiment, the historical data is data for the guaranteed inventory sold by an online publisher for the previous two years. One skilled in the art will appreciate that historical database 110 may contain data for a shorter or a longer period of time.

For guaranteed inventory, the historical demand data may include property&position data for each contract through which the guaranteed inventory was sold. The property&position data identifies a publisher property (e.g., Yahoo! Autos, Yahoo! Sports, Yahoo! Finance, and the like) and the location on the property where the impression was or will be located. The historical demand data may also include the period of time or duration for which the contract was executed, e.g., from March 1 to June 30, and the date on which the contract was booked. In some embodiments, the historical demand data may also include target profile information. For example, the historical demand data may identify that a contract for impressions was targeted to women between the ages of 20 and 29 who live in New Jersey while another contract may have been targeted to men between the ages of 30 and 39 who live in Alabama. One skilled in the art will understand that the historical data may include any variety of parameters or attributes that identify the advertising inventory for a particular contract.

Current demand database 112 is configured to supply second demand forecasting engine 104 and adjustment engine 106 with current demand data for guaranteed inventory. For example, current demand database 112 may include property&position data as well as target profile information for all inventory guaranteed by contract currently scheduled for delivery in the future.

First demand forecasting engine 102 is configured to perform long-term demand forecasting using the historical demand data stored in historical database 110. In one embodiment, the long-term forecasting is performed for a period beginning in the second month from the current date and ending twelve months from the current date. For example, if the current date is January 1, then the long-term forecasting is performed for February through December of the current year. However, long-term forecasting may be performed for other periods of time including, but not limited to, a six-month period starting in five months, a nine-month period starting in three months, and the like. One skilled in the art will appreciate that other time periods, such as time periods which are not quantized on a monthly basis may be used for long-term forecasting.

To perform long-term forecasting, first demand forecasting engine 102 builds "baseline" models, e.g., the property&position level, for each property and position combination using the historical contract data stored in historical database 110. The baseline models identify the total historical demand for each contract having the same property&position values. For all historical contracts, the contracts that target the same property&position are collected in a set, $C^j$, where j is an element, e.g., a property&position, in j∈P. In some embodiments, P is the Cartesian product of {all properties} and {all positions). In some embodiments, P is the Cartesian product of {all properties} and {all positions} and {all advertiser categories}. Examples of advertiser categories includes, but are not limited to, automobile manufacturers, pharmaceutical companies, department stores, and the like. One skilled in the art will appreciate that P may include other attributes in addition to properties, positions, and advertiser categories that identify an advertising inventory.

For each one of the contracts in set $C^j$, the historical demand volume is evenly distributed into days to get a daily volume value. For example, if a contract was booked for 100,000 impressions between June 1 and June 10 of the previous year, then the daily demand for the contract is 10,000 impressions (e.g., 100,000 impressions/10 days=10,000 impressions/day). The monthly volume is determined by summing the daily volume values for each contract for a particular month. For example, assume there are two contracts with the same targeting profile and one contract was booked from June 20 to July 20 with 1,000,000 impressions per day and the other was booked from June 10 to July 30 with 2,000,000 impressions per day. The first contract contributes 11,000,000 impressions to June's monthly volume (1,000,000 impressions/day*11 days in June) and 20,000,000 impressions to July's monthly volume (1,000,000 impressions/day*20 days in July). The second contract contributes 42,000,000 impressions to June (2,000,000 impressions/day*21 days in June) and 60,000,000 impressions to July (2,000,000 impressions/day*30 days in July). Thus, June will have 53,000,000 impressions for the specific targeting profile (11,000,000+42,000,000), and July will have 80,000,000 impressions for the specific targeting profile (20,000,000+60,000,000). Baselines are collected for each different combination of properties and positions, or for all properties, positions, and advertiser categories, e.g., for $C^{j+1}$, $C^{j+2}$, etc.

First demand forecasting engine 102 may apply time series models to the collected historical time series data. In one embodiment, first demand forecasting engine 102 may be configured to perform time series forecasting using autoregressive integrated moving average (ARIMA) models using the data stored in time series historical database 110. In some embodiments, other time series forecasting models including, but not limited to, autoregressive (AR) models, moving average (MA) models, autoregressive moving average (ARMA) models, autoregressive fractionally integrated moving average (ARFIMA) models, or artificial neural network (ANN) models may be used. Applying the time series forecasting models to the historical time series models projects the future monthly volume for all contracts in $C^j$.

First demand forecasting engine 102 may also determine monthly demand ratios for targeting profiles of each property&position. To generate the monthly demand ratios, first demand forecasting engine 102 may distinguish each of the different targeting profiles within a set of contracts, $C^j$. Each of the contracts having the same targeting profile is put into the same contracts sub-set, $c_i^j$. The monthly volume for each targeting profile sub-set $c_i^j$ within set $C^j$ may then be combined.

Ratios for historical demand for contracts for advertising inventory having the same attributes, e.g., $c_i^j$, may be calculated on a monthly or yearly basis. For example, the percentage of the demand for contract $c_i^j$ in terms of all contracts in $C^j$ for a year may be calculated as follows:

$$\text{ratio} = \frac{\sum_m d_i^j(m)}{\sum_m d^j(m)} \quad \text{Eq. 1}$$

Where,
m is the month index, for m=1, 2, 3, ..., 12, and
d is the demand volume

Similarly, the average annual revenue percentage of $c_i^j$ in terms of all contracts in $C^j$ may be calculated as:

$$\text{ratio} = \frac{\sum_m r_i^j(m)}{\sum_m r^j(m)} \quad \text{Eq. 2}$$

Where,
m is the month index, for m=1, 2, 3, ..., 12, and
r is the revenue

A monthly ratio of $c_i^j$ in $C^j$ in terms of demand volume may be calculated using the following equation:

$$\text{ratio}(m) = \frac{d_i^j(m)}{d^j(m)} \quad \text{Eq. 3}$$

The monthly ratio of $c_i^j$ in $C^j$ in terms of revenue volume is calculated as:

$$\text{ratio}(m) = \frac{r_i^j(m)}{r^j(m)} \quad \text{Eq. 4}$$

A subset is then selected from $c_i^j$, denote as $\hat{c}_i^j$, according to certain thresholds. Example thresholds include, but are not limited to, the top 500 contracts in terms of historical annual demand volume ratio, contracts having a historical monthly revenue ratio $\geq 0.5\%$, or contracts having a monthly historical volume ratio $\geq 0.5\%$. In one embodiment, as long as one of the three thresholds is met, then the contract is included for additional forecasting. For example, a contract may have a monthly revenue ratio and a monthly volume ratio below 0.5%, but it may be one of the top 500 contracts in terms of the annual demand volume. Accordingly, the contract would be selected and included in the contracts that will be forecasted. Applying the thresholds to the contracts reduces the amount of forecasting that needs to be performed while ensuring that the contracts on which the forecasting is being performed are the most significant contracts in terms of revenue and volume.

The ratios are applied to the subset $\hat{c}_i^j$ to determine the historical monthly demand volume $d^j(m)$ for a contract for advertising inventory having a certain targeting profile, e.g., advertising inventory with certain targeting attributes. Put another way, the calculated monthly ratios are applied to the baseline projections generated time series forecasting of property&position levels to determine the monthly buckets for each targeting profile within a property&position, e.g., the forecasted demand for each of the profiles for each property&position on a per month basis. For example, if the total forecasted demand determined by the time series forecast for the month of June for property&position Yahoo! Autos may be 1,000,000 and a certain targeting profile within this property&position, such as males between the ages of 20 and 25, may have a demand ratio of 5%. Accordingly, applying the monthly ratio to the forecasted demand yields a demand of 50,000 for the month of June for Yahoo! Autos targeting males between the ages of 20 and 25. In some embodiments, an annual ratio may be applied as a monthly ratio for all months. For example, a subset $\hat{c}_i^j$ for a specific property&position targeting women between the ages of 20 and 29 may have an annual ratio of ten percent. Accordingly, ten percent of the contracts each month for the property&position will be assumed to target women between the ages of 20 and 29.

The summation of the monthly demand for all $\hat{c}_i^j$ within $C^j$ is then deducted and the remaining demand is used as the monthly non-targeting demand for $C^j$. Put another way, if contract $\hat{c}_i^j$ is ten percent of the total demand, then the ten percent is subtracted from the total demand and the remaining 90 percent is forecasted for the remaining targeting profiles, which are merged to the property&position level, i.e., merged into $C^j$.

Second demand forecasting engine 104 is configured to generate a short-term demand forecast, $d_s$. In some embodiments, second demand forecasting engine may generate a demand forecast for a predetermined period of time that is less than, equal to, or longer than the period of time for which the first demand forecast engine 102 generates a demand forecast. In some embodiments, second demand forecasting engine 104 uses a booking curve, e.g., a plot of percentage booking over a period of time, including both the mean and standard deviation, using the historical contract data stored in historical database 110 to generate the short-term demand forecast. In one embodiment, second demand forecasting engine 104 is configured to generate booking curves for each combination of property, position, an -month of a year. Note that in other embodiments second demand forecasting engine 104 may generate booking curves for each property, position, advertiser category, and month of a year.

Figure 4:
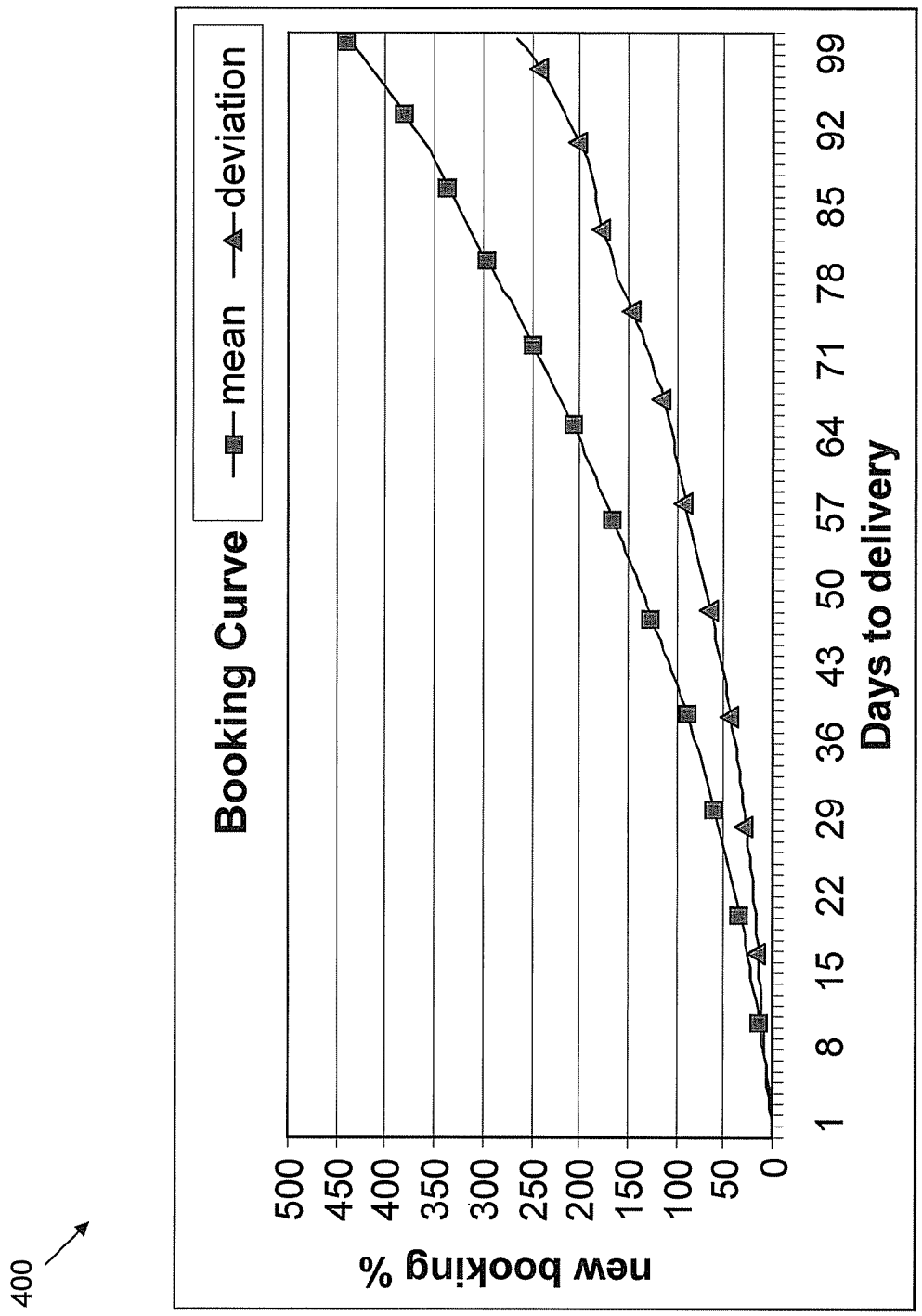
FIG. 4 is one example of a booking curve in accordance with the present disclosure.

An example of a booking curve 400 is illustrated in FIG. 4. The x-axis of booking curve 400 denotes the number of days before an impression is scheduled to be delivered, and the y-axis denotes the percentage of existing demand. For example, at x=30, the mean percentage, w, is 56 percent with a standard deviation percentage, v, of 27 percent. Assuming, for example, that it is July 30 and Z impressions have been booked or scheduled to deliver on July 31, the booking curve shows that Z*56 percent of the impressions are expected to be booked within the next 30 days with a standard deviation of Z*27 percent.

Second demand forecasting engine 102 may generate the demand increment, e.g., the difference between the forecasted demand and the number of existing contracts, using the generated booking curves and the existing contract data from the existing contract database 112. To determine the demand increment for the next several days, week, or month, second demand forecasting engine 104 will use the historical data stored in historical database 110 and determine the demand increment for advertising inventory having the same attributes that were booked within the relevant time period. For example, the historical data may identify that fifteen percent of the contracts for a given month were booked the week before. Accordingly, second demand forecasting engine 104 may receive the current demand data from current demand database 110 and determine that the demand increment should be equal to fifteen percent of the current contract demand level. The demand increments may be identified for each property&position value as well as for each targeting profile. These demand increments may then be added to the current short-term demand forecast to provide the short-term demand $d_s$.

Adjustment engine 106 may subtract the current demand from the monthly buckets calculated by first demand forecasting engine 102 to determine the new demand that is forecasted to be booked, e.g., long-term demand $d_l$. For each booked contract in B, the existing booked contract series, combine engine 108 finds a forecast contract in the total forecast demand for a future month that shares the same targeting profile. One example for removing existing demand, e.g., currently booked but yet to be delivered, from a forecasted demand is described as follows.

Let, c be a contract c.demand be contract demand c.duration be contract duration c.tgt be contract target $C^e$ be the existing contract list, $C^e=[c_1^e, c_2^e, \ldots, c_n^e]$; and $C^f$ be the forecast contract list, $C^f=[c_1^f, c_2^f, \ldots, c_m^f]$ First, set i=1 and scan an existing contract, $c_i^e$, over the set of forecasted contracts, $C^f$. If the targeting profile of a forecasted contract, $c_j^f$, matches the targeting profile of an existing contract, e.g., $c_j^f.tgt=c_i^e.tgt$, and the duration of the forecasted contract intersects (or overlaps) with the duration of the existing contract, e.g., $c_j^f.duration \cap c_i^e.duration \neq \phi$, then the Bookdemand is calculated. Otherwise, i is incremented, e.g., i=i+1, and the contract $c_i^e$ is scanned over $C^f$.

The Bookdemand is the amount of demand for contracts having the same targeting profile that is currently booked. Bookdemand may be calculated by dividing the period of intersection of the two contracts, e.g., the booked contract and the forecasted contract, by the duration of the existing contract and then multiplying the quotient by the demand of the existing contract as shown in Equation 5 below.

$$Bookdemand = \frac{c_i^e \cdot duration \cap c_j^f \cdot duration}{c_i^e \cdot duration} \times c_i^e \cdot demand \quad \text{Eq. 5}$$

For example, a forecasted contract may be forecasted for the entire month of June and an existing contract may be for 1 million impressions between June 1 and July 30. Accordingly, the $c_j^f$.duration would be 30, the $c_i^e$.duration would be 60, and the $c_i^e$.demand would be 1 million. Thus, the Bookdemand for this example would be 500,000 impressions as the existing contract has a duration that is twice the duration of the contract being forecasted and thus only overlaps for a period of 50 percent of the existing contract.

If the forecasted demand, $c_j^f$.demand, is greater than or equal to the calculated Bookdemand, then the Bookdemand is subtracted from the forecasted demand $c_j^f$.demand, i.e. the forecasted demand volume is set to $c_n^f$.demand—Bookdemand, which provides a Bookdemand value that takes into account existing demand. Put another way, the forecasted demand is reduced by the existing demand to identify the demand that has yet to be booked. Once this Bookdemand value is calculated, it may be stored in a memory, e.g., main memory 204 or secondary memory 208, and the next existing contract may be selected, e.g., i is incremented, and the contract $c_{i+1}^e$ is scanned over $C^f$.

If the forecasted demand, $c_j^f$.demand, is less than the Bookdemand, then the forecasted demand value is set to zero and the extra Bookdemand, e.g., Bookdemand—$c_j^f$.demand, is redistributed to the remaining targeting profiles within the same property&position levels as $c_j^f$. Redistribution of the amount of Bookdemand that exceeds the forecasted demand is performed to ensure that the property&position value determined by the first demand forecast engine 102 is not exceeded. To redistribute the excess demand, a CDemand value is initially set to zero. The demand ratio, $r_k$ for all forecasted demand may be calculated as follows:

$$r_k = \frac{c_k^f \cdot demand}{\sum_k c_k^f \cdot demand} \quad \text{Eq. 6}$$

Where, k is the index of all other profiles within the same property&position as $c_j^f$ For each of the forecasted contracts, the demand ratio, $r_k$, is multiplied by the Bookdemand to determine the proportional demand for the contract as follows:

$$Propdemand = r_k \times Bookdemand \quad \text{Eq. 7}$$

If the Propdemand is greater than $c_k^f$.demand, then the demand for the contract, $c_k^f$.demand, is set to zero and the contract demand, $c_k^f$.demand, is added to the current CDemand value, e.g., CDemand=CDemand+$c_k^f$.demand. However, if Propdemand is less than or equal to $c_k^f$.demand, then the demand for the contract is set to $c_k^f$.demand—PropDemand, and the PropDemand is added to the current CDemand value.

Next, the current CDemand value is subtracted from the current Bookdemand value. If the difference between the CDemand and the Bookdemand is less than a predetermined tolerance value, e.g., tolerance, then the next existing contract, $c_{i+1}^e$, is selected and the process described above starting by recalculating Bookdemand using Equation 5 is repeated for the contract $c_{i+1}^e$.

If the difference between the CDemand and the Bookdemand is greater than or equal to the tolerance, then CDemand is set to zero and the demand ratio, $r_k$, is recalculated using Equation 6 with k being the index of all contracts $c_k^f$ within the same property&postion as $c_k^f$. The method may be recursively performed until the difference between CDemand and the Bookdemand is less than the predetermined tolerance. In this manner, adjustment engine 106 removes the demand that has already been booked, B, from the total forecast demand for a future month. This yields the new demand that is forecasted to be booked, $d_l$.

Combine engine 108 is configured to combine the short-term demand forecast $d_s$ from second demand forecasting engine 104 and the long-term demand forecast $d_l$ from adjustment engine 106. Assuming that both the short-term and long-term demand forecasts are two random variables, then both the short-term and long-term forecasts are normal distributions each having a mean, $\mu_s$ and $\mu_l$, and variance $\sigma^2_s$ and $\sigma^2_l$, respectively. Note that the manner in which the mean and variances are calculated may vary in accordance with whatever the time-forecasting model is implemented.

To combine the forecasts, combine engine 108 may set the combined forecast demand as a random variable with a probability distribution function (PDF) equal to the multiplication of the short-term PDF and the long-term PDF. Assuming that both the short-term and long-term forecasts have a normal distribution, then the combined forecast demand is also a normal distribution having a mean which may be calculated as follows:

$$F = \frac{\sigma_l^2 \mu_s + \sigma_s^2 \mu_l}{\sigma_l^2 + \sigma_s^2} \qquad \text{Eq. 8}$$

This mean value, F, is used as the final combined net forecasted demand, e.g., a demand forecast that excludes the existing contracts. The net demand forecast identifies the demand volume that is expected to be booked for each of the plurality of advertising inventories for a predetermined period of time that is based on the long-term and short-term forecasting periods. The period of time for the net forecasting may be a union of the short-term and long-term forecasts, which in some embodiments may be equal to the sum of the periods of the long-term and short-term forecasts. The net demand forecast enables an online publisher to identify the number of contracts that it may expect to book for each property&position value as well as for each targeting profile in the next week, month, year, etc.

Figure 3:
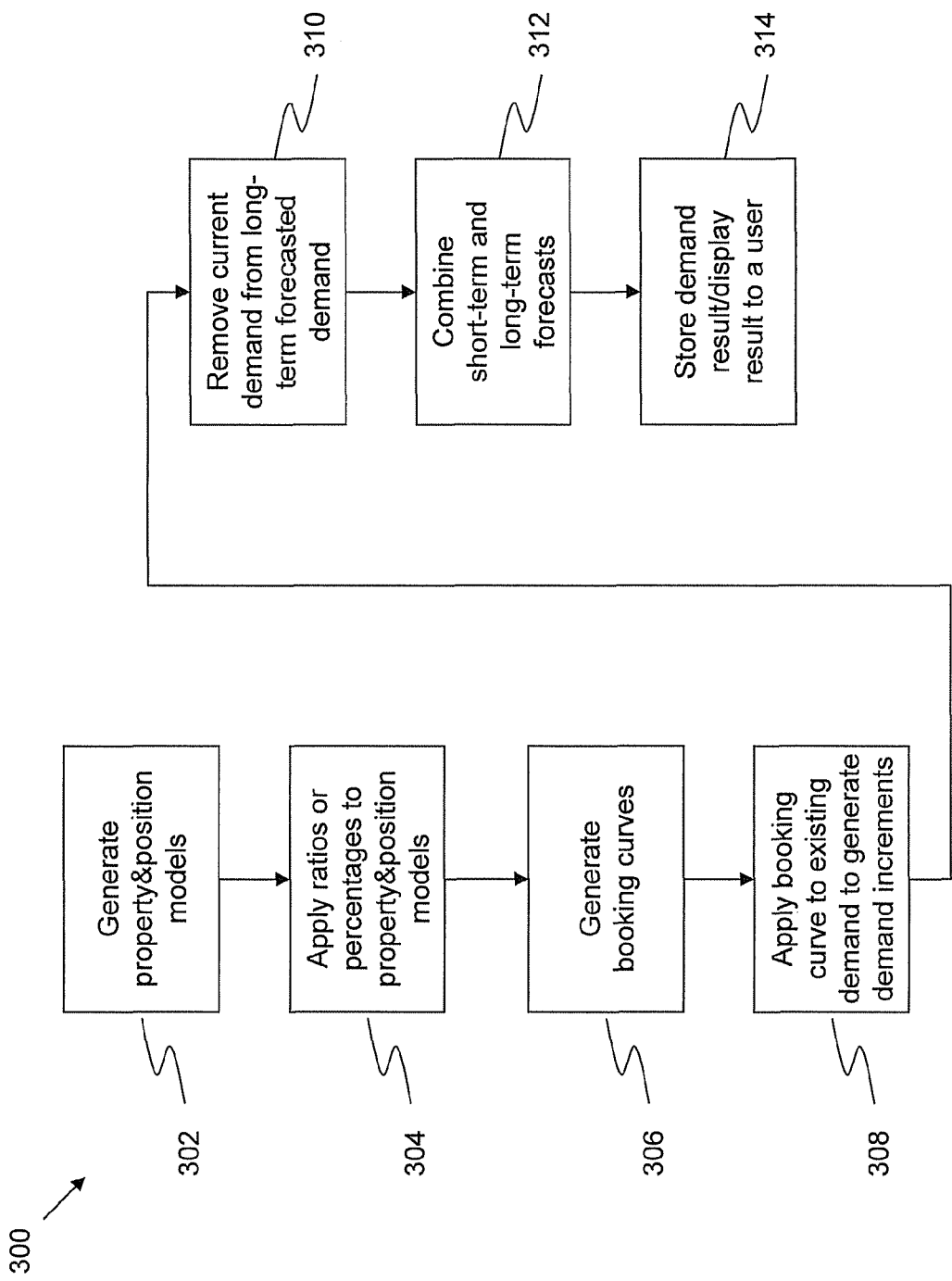
FIG. 3 is a flow chart of a method of demand forecasting in accordance with the system shown in FIG. 1.

With reference to FIGS. 1 and 3, an improved method 300 for forecasting demand is now described. At block 302, first demand forecast engine 102 generates property&position levels on a monthly basis. Monthly ratios, modeled from historical targeting contracts, are applied to the baselines by first demand forecasting engine 102 to determine the monthly buckets for each targeting profile at block 304.

At block 306, second demand forecasting engine 104 generates booking curves from the data stored in historical database 110. At block 308, second demand forecasting engine 104 applies the generated booking curves to the existing contract demand to determine the demand increment. First demand forecasting engine 102 and second demand forecasting engine 106 may perform the short-term forecast and the long-term forecast in parallel to one another or sequentially, e.g., block 302, 304 and 306, 308 may be performed at the same time or sequentially.

At block 310, adjustment engine 106 subtracts the existing demand from the forecasted long-term demand. Adjustment engine 106 removes the existing contracts from the forecasted long-term demand by determining if an existing contract having a targeting profile and duration will intersect or overlap with the duration of a forecasted contract having the same targeting profile. If an existing contract intersects a forecasted contract, then the demand of the forecasted contract is reduced proportionally to the amount of overlap between the duration of the existing contract and the forecasted contract. However, if the existing contract demand is greater than the forecasted demand, then the existing forecasted demand is reduced by the amount of the forecasted demand, and the excess or cumulative demand is applied to the demand for the remaining forecasted contracts in proportion to the percentage of the forecasted contracts' demand to the total forecasted demand. If an existing contract does not intersect a forecasted contract, then the forecasted demand is set to zero and Bookdemand is calculated in accordance with Equation 5, but substituting $month_k$ for $c_i^f$.duration, where k is the index of all months with which $c_i^e$.duration intersects (overlaps).

At block 312 the short-term forecast and the adjusted long-term forecast are combined by combine engine 108. Combine engine 108 combines the short-term forecast and the adjusted long-term forecast by taking a weighted average of the short-term and adjusted long-term forecasts for each property&position combination The final forecasted demand is displayed to a user through a display coupled to the server 200 and/or is stored in a memory, such as, for example, main memory 204, secondary memory 208, and the like at block 314. The displayed or stored demand forecast may be used by a publisher to more accurately price its inventory. For example, the demand forecast may identify that the center banner position on Yahoo! Autos has a greater demand than a small button ad on Yahoo! Finance. Accordingly, the publisher may sell the banner on Yahoo! Autos at a higher price than the button on Yahoo! Finance. Thus the demand forecast at least partly determines a price that is rendered or transmitted electronically to advertisers. The advertisers make payments in the amounts determined by the prices based at least partly on the demand forecast, for example, through online payments using a credit, debit, or pre-paid account, or electronic funds transfer. The advertisements are then rendered in response to the payments.

The demand forecasting system 100 also enables an online publisher to manage its inventory and pricing of the inventory by being provided with a current demand forecast that takes into account current demand levels. Accordingly, the demand forecast provided by demand forecasting system 100 enables an online publisher to be able to identify how much inventory is remaining to avoid overbooking of inventory. The demand forecasting system 100 may also be integrated into a larger delivery display advertising system through which an online publisher may receive be able to book contracts and receive payment for the contracts.

In addition to the above described embodiments, the disclosed method and system may be embodied in the form of computer-implemented processes and apparatus for practicing those processes. The present disclosed method and apparatus may also be embodied in the form of computer program code embodied in tangible storage media, such as floppy diskettes, read only memories (ROMs), CD-ROMs, hard drives, "ZIP™" high density disk drives, DVD-ROMs, flash memory drives, or any other computer-readable storage medium, wherein, when the computer program code is loaded into and executed by a computer, the computer becomes an apparatus for practicing the disclosed method and system. The present disclosed method and apparatus may also be embodied in the form of computer program code, for example, whether stored in a storage medium, loaded into and/or executed by a computer, wherein, when the computer program code is loaded into and executed by a computer, the computer becomes a special-purpose apparatus for practicing the disclosed method. When implemented on a general-purpose processor, the computer program code segments configure the processor to create specific logic circuits. The invention may alternatively be embodied in a digital signal processor formed of application specific integrated circuits for performing a method according to the principles of the invention.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A system, comprising:
    a processor;
    a storage medium; and
    a communications bus coupling the processor and the storage medium;
    wherein the storage medium is encoded to include historical demand data for a plurality of advertising inventories; and
    wherein the storage medium is encoded to include executable code to perform a process including:
    generating a first demand forecast for each inventory of the plurality of advertising inventories for a first predetermined period of time based on the historical data,
    generating a second demand forecast for each inventory of the plurality of advertising inventories for a second predetermined period of time based on the historical data,
    adjusting the first demand forecast for each inventory of the plurality of advertising inventories by removing an existing demand for each inventory of the plurality of advertising inventories, and
    generating a net forecasting demand for each inventory of the plurality of advertising inventories for a third predetermined period of time by combining the second demand forecast and an adjusted first demand forecast, the third predetermined period of time based on the first and second predetermined periods,
    wherein combining the second demand forecast and the adjusted first demand forecast includes taking a weighted average of the second demand forecast and the adjusted first demand forecast, and wherein the weighted average is calculated according to:

$$F = \frac{\sigma_l^2 \mu_s + \sigma_s^2 \mu_l}{\sigma_l^2 + \sigma_s^2}$$

where,
$\mu_s$ is the mean of the second demand forecast,
$\mu_l$ is the mean of the adjusted first demand forecast,
$\sigma_s^2$ is the variance of the second demand forecast, and
$\sigma_l^2$ is the variance of the adjusted first demand forecast.

2. The system of claim 1, wherein the processor is further configured for proportionally reallocating a portion of an existing demand for a first advertising inventory to at least a second advertising inventory if an existing demand of the first advertising inventory is greater than a first demand forecast for the first advertising inventory.

3. The system of claim 1, wherein a database includes the existing demand for each inventory of the plurality of advertising inventories.

4. The system of claim 1, wherein the third predetermined period of time is a union of the first predetermined period of time and the second predetermined period of time.

5. A method, comprising:
    using a computer server with a first demand forecast engine, generating a first demand forecast for a plurality of advertising inventories, the first demand forecast identifying a demand for each inventory of the plurality of advertising inventories for a first predetermined period of time;
    generating a second demand forecast for the plurality of advertising inventories, the second demand forecast identifying a demand for each inventory of the plurality of advertising inventories for a second predetermined period of time;
    adjusting the first demand forecast for at least one of the plurality of advertising inventories by reducing the first demand forecast by an amount of an existing demand for the at least one advertising inventory;
    combining the second demand forecast with an adjusted first demand forecast for the each inventory of the plurality of advertising inventories to identify a net demand forecast for each inventory of the plurality of advertising inventories for a third predetermined period of time, wherein the third predetermined period of time is based on the first predetermined period of time and the second predetermined period of time; and
    outputting the net demand forecast for each inventory of the plurality of advertising inventories to a display or machine readable storage medium,
    wherein combining the second demand forecast and the adjusted first demand forecast includes taking a weighted average of the second demand forecast and the adjusted first demand forecast, and wherein the weighted average is calculated according to:

$$F = \frac{\sigma_l^2 \mu_s + \sigma_s^2 \mu_l}{\sigma_l^2 + \sigma_s^2}$$

where,
$\mu_s$ is the mean of the second demand forecast,
$\mu_l$ is the mean of the adjusted first demand forecast,
$\sigma_s^2$ is the variance of the second demand forecast, and
$\sigma_l^2$ is the variance of the adjusted first demand forecast.

6. The method of claim 5,
    wherein generating the first demand forecast includes:
    combining historical demand data for each inventory of the plurality of advertising inventories to create a time series for each inventory of the plurality of advertising inventories;
    generating a time series demand forecast for the plurality of advertising inventories from the time series; and
    generating a monthly demand ratio for each inventory of the plurality of advertising inventories, the monthly demand ratio identifying a demand for an advertising inventory having a first plurality of attributes compared to the demand for the plurality of advertising inventories.

7. The method of claim 5,
wherein generating the second demand forecast includes:
generating a booking curve from historical demand data for each inventory of the plurality of advertising inventories; and
determining a demand increment for each inventory of the plurality of advertising inventories by applying the booking curve for the inventory on existing demand for the inventory.

8. The method of claim 5,
wherein adjusting the first demand forecast includes:
comparing a first demand forecast for a first advertising inventory to an existing demand for a first advertising demand value;
subtracting the existing demand for the first advertising inventory from the first demand forecast for the first advertising inventory if the first demand forecast is greater than or equal to the existing demand; and
reallocating a portion of the existing demand for the first advertising inventory to at least a second advertising inventory if the existing demand for the first advertising inventory is greater than the first demand forecast for the first advertising inventory.

9. The method of claim 5, wherein the third predetermined period of time is a union of the first predetermined period of time and the second predetermined period of time.

10. A non-transitory computer readable storage medium encoded with computer readable code to perform a method comprising:
generating a first demand forecast for a plurality of advertising inventories, the first demand forecast identifying a demand for each inventory of the plurality of advertising inventories for a first predetermined period of time;
generating a second demand forecast for the plurality of advertising inventories, the second demand forecast identifying a demand for each inventory of the plurality of advertising inventories for a second predetermined period of time;
adjusting the first demand forecast for at least one of the plurality of advertising inventories by reducing the first demand forecast by an amount of an existing demand for the advertising inventory;
combining the second demand forecast with an adjusted first demand forecast for the each inventory of the plurality of advertising inventories to identify a net demand forecast for each inventory of the plurality of advertising inventories, the net demand forecast identifying a demand for each inventory of the plurality of advertising inventories for a third predetermined period of time, wherein the third predetermined period of time is based on the first predetermined period of time and the second predetermined period of time; and
outputting the demand forecast for each inventory of the plurality of advertising inventories to a display or machine readable storage medium,
wherein combining the second demand forecast and the adjusted first demand forecast includes taking a weighted average of the second demand forecast and the adjusted first demand forecast, and wherein the weighted average is calculated according to:

$$F = \frac{\sigma_I^2 \mu_s + \sigma_s^2 \mu_I}{\sigma_I^2 + \sigma_s^2}$$

where,
$\mu_s$ is the mean of the second demand forecast,
$\mu_I$ is the mean of the adjusted first demand forecast,
$\sigma_s^2$ is the variance of the second demand forecast, and
$\sigma_I^2$ is the variance of the adjusted first demand forecast.

11. The non-transitory computer readable storage medium of claim 10,
wherein generating the first demand forecast includes:
combining historical demand data for each inventory of the plurality of advertising inventories to create a time series for each of the plurality of advertising inventories;
generating a time series demand forecast for the plurality of advertising inventories from the time series;
generating a monthly demand ratio for each inventory of the plurality of advertising inventories, the monthly demand ratio identifying a demand for a first advertising inventory compared to the demand for the plurality of advertising inventories.

12. The non-transitory computer readable storage medium of claim 10,
wherein adjusting the first demand forecast includes:
comparing a first demand forecast for a first advertising inventory to an existing demand for a first advertising demand value;
subtracting the existing demand for the first advertising inventory from the first demand forecast for the first advertising inventory if the first demand forecast is greater than or equal to the existing demand; and
reallocating a portion of the existing demand for the first advertising inventory to at least a second advertising inventory if the existing demand for the first advertising inventory is greater than the first demand forecast for the first advertising inventory.

13. The non-transitory computer readable storage medium of claim 10, wherein the third predetermined period of time is a union of the first predetermined period of time and the second predetermined period of time.

* * * * *